United States Patent
Conway et al.

(10) Patent No.: US 10,522,257 B1
(45) Date of Patent: Dec. 31, 2019

(54) IN-CONTAINMENT SPENT FUEL STORAGE TO LIMIT SPENT FUEL POOL WATER MAKEUP

(71) Applicant: Westinghouse Electric Company LLC, Cranberry Township, PA (US)

(72) Inventors: Lawrence E. Conway, Monroeville, PA (US); Jerzy Chrzanowski, Cranberry Township, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 1957 days.

(21) Appl. No.: 14/195,890

(22) Filed: Mar. 4, 2014

Related U.S. Application Data

(60) Provisional application No. 61/781,245, filed on Mar. 14, 2013.

(51) Int. Cl.
*G21C 19/07* (2006.01)
*G21D 1/02* (2006.01)
*G21C 19/32* (2006.01)

(52) U.S. Cl.
CPC ............ *G21C 19/07* (2013.01); *G21C 19/32* (2013.01); *G21D 1/02* (2013.01)

(58) Field of Classification Search
CPC .......... G21D 1/02; G21C 19/02; G21C 19/04; G21C 19/07; G21C 19/18; G21C 19/19; G21C 19/32
See application file for complete search history.

(56) References Cited

U.S. PATENT DOCUMENTS

| | | | | |
|---|---|---|---|---|
| 3,865,688 A | * | 2/1975 | Kleimola | G21C 9/00 376/246 |
| 4,165,255 A | * | 8/1979 | Knight | G21C 19/07 254/122 |
| 4,400,344 A | * | 8/1983 | Wachter | G21C 19/07 250/506.1 |
| 4,473,528 A | | 9/1984 | Kleimola | |

(Continued)

FOREIGN PATENT DOCUMENTS

| | | |
|---|---|---|
| FR | 2431752 A1 | 2/1980 |
| JP | H09243790 A | 9/1997 |

(Continued)

OTHER PUBLICATIONS

Westinghouse Electric Company LLC, EP 14801559.7, Supplemental European Search Report, dated Sep. 29, 2016, 5 pages.

(Continued)

*Primary Examiner* — Sharon M Davis
(74) *Attorney, Agent, or Firm* — Joseph C. Spadacene; Westinghouse Electric Company LLC

(57) ABSTRACT

A method and apparatus for extending the period a nuclear steam supply system spent fuel pool can be safely passively cooled by storing the spent fuel offloaded from the reactor, in the containment for one reactor operating cycle. During a refueling the spent fuel that is not to be returned to the reactor and the spent fuel that will be returned to the reactor are stored separately in shielded locations within the containment. After one operating cycle, the spent fuel stored within the containment that was not returned to the reactor just prior to the last operating cycle, is offloaded to the spent fuel pool and replaced by the newly offloaded spent fuel that is being retired.

6 Claims, 7 Drawing Sheets

(56) References Cited

U.S. PATENT DOCUMENTS

| | | | |
|---|---|---|---|
| 4,826,651 A * | 5/1989 | Day | G21C 19/18 |
| | | | 33/502 |
| 5,075,070 A | 12/1991 | Costes | |
| 5,271,051 A | 12/1993 | Corletti et al. | |
| 5,291,531 A | 3/1994 | Baversten et al. | |
| 6,266,386 B1 * | 7/2001 | Patel | G21C 19/02 |
| | | | 376/260 |
| 8,559,584 B2 | 10/2013 | Cook | |
| 2012/0155597 A1 | 6/2012 | Cook | |
| 2013/0272474 A1 | 10/2013 | Conway | |

FOREIGN PATENT DOCUMENTS

| | | |
|---|---|---|
| WO | 2012/134611 A1 | 10/2012 |
| WO | 2012134611 | 10/2012 |

OTHER PUBLICATIONS

Gorgemans, J., et al., AP1000 Nuclear Power Plant Safety Overview for Spent Fuel Cooling, International Congress on Advances in Nuclear Power Plants 2012 (ICAPP 2012), vol. 1 of 4, Chicago, IL, USA, Jun. 24-28, 2012, pp. 1, 102-109.

International Search Report and Written Opinion of the International Searching Authority for PCT/US2014/021641 dated Dec. 15, 2014 (Forms PCT/ISA/220, PCT/ISA/210, PCT/ISA/237).

\* cited by examiner

ND CONTAINMENT SPENT FUEL STORAGE TO LIMIT SPENT FUEL POOL WATER MAKEUP

CROSS REFERENCE TO RELATED APPLICATIONS

This application claims priority under 35 U.S.C. § 119(e) to U.S. Provisional Patent Application Ser. No. 61/781,245, filed Mar. 14, 2013, entitled IN-CONTAINMENT SPENT FUEL STORAGE TO LIMIT SPENT FUEL POOL WATER MAKEUP. This invention is also related to U.S. patent application Ser. No. 14/195,878, entitled Apparatus for Passively Cooling a Nuclear Plant Coolant Reservoir, filed concurrently herewith.

BACKGROUND

1. Field

The present invention relates to a passive spent fuel cooling system for a nuclear power plant and more specifically to in-containment spent fuel storage to limit spent fuel pool water make-up.

2. Related Art

The secondary side of nuclear reactor power generating systems creates steam for the generation of saleable electricity. For reactor types such as pressurized water reactors or liquid metal cooled reactors, the primary side comprises a closed circuit which is isolated and in heat exchange relationship with a secondary circuit for the production of useful steam. For reactor types such as boiling water reactors or gas cooled reactors, the gas used for generating saleable electricity is heated directly in the reactor core. A pressurized water reactor application will be described as an exemplary use of the concepts claimed hereafter; though it should be appreciated that other types of reactors may benefit equally from the concepts disclosed herein as well.

The primary side of a pressurized water reactor system comprises a reactor vessel enclosing a core internal structure that supports a plurality of fuel assemblies containing fissile material, the primary circuit within heat exchange steam generators, the inner volume of a pressurizer, pumps and pipes for circulating pressurized water; the pipes connecting each of the steam generators and pumps to the reactor vessel independently. Each of the parts of the primary side comprising a steam generator, a pump and a system of pipes, which are connected to the vessel, form a loop of the primary side.

For the purpose of illustration, FIG. 1 shows a simplified pressurized water nuclear reactor primary system, including a generally cylindrical reactor pressure vessel 10 having a closure head 12 enclosing a nuclear core 14. A liquid reactor coolant, such as water, is pumped into the vessel 10 by pumps 16 through the core 14 where heat energy is absorbed and is discharged through a heat exchanger 18, typically referred to as a steam generator, in which heat is transferred to a utilization circuit (not shown) such as a steam driven turbine generator. The reactor coolant is then returned to the pump 16 completing the primary loop. Typically, a plurality of the above-described loops are connected to a single reactor vessel 10 by reactor coolant piping 20.

Pressurized water nuclear reactors are typically refueled on an 12-18 month cycle. During the refueling process, a portion of the irradiated fuel assemblies within the core are removed and replenished with fresh fuel assemblies which are relocated around the core. The removed spent fuel assemblies are typically transferred under water out of the reactor containment 22 to a separate building that houses a spent fuel pool, figuratively shown in FIG. 1 and designated by reference character 24, in which these radioactive fuel assemblies are stored. The water in the spent fuel pool is deep enough to shield radiation to an acceptable level and prevents the fuel rods within the fuel assemblies from reaching temperatures that could breach the cladding of the fuel rods which hermetically house the radioactive fuel material and fission products. Cooling continues at least until the decay heat within the fuel assemblies is brought down to a level where the temperature of the assemblies is acceptable for dry storage.

Events in Japan's Fukushima Dai-ichi Nuclear Power Plant reinforced concerns over the possible consequences of the loss of power over an extended period to the systems that cool spent fuel pools. As a result of the tsunami, there was a loss of off-site and on-site power which resulted in a station blackout period. The loss of power shut down the spent fuel pool cooling systems. The water in some of the spent fuel pools dissipated through vaporization and evaporation due to a rise in the temperature of the pools, heated by the highly radioactive spent fuel assemblies submerged therein. Without power over an extended period to pump replacement water into the pools the fuel assemblies could potentially become uncovered, which could, theoretically, raise the temperature of the fuel rods in those assemblies, possibly leading to a breach in the cladding of those fuel rods and the possible escape of radioactivity into the environment.

More recently designed passively cooled nuclear plants, such as the AP1000® nuclear plant design offered by Westinghouse Electric Company LLC, Cranberry Township, Pennsylvania, which utilizes passive safety systems, has been evaluated to be able to continue to provide cooling for at least three days following an extreme event like the one at Fukushima.

It is an object of this invention to modify the way spent fuel is handled and stored so that the spent fuel can be cooled for at least ten days following a Fukushima type of event.

It is a further object of this invention to provide such cooling passively to enable a commercial 1,100 megawatt nuclear plant to provide core and spent fuel cooling using passive means for ten or more days.

SUMMARY

These and other objects are achieved by a nuclear steam supply system having a nuclear reactor primary coolant loop enclosed within a hermetically sealed containment. The containment includes a nuclear reactor vessel for supporting and housing a plurality of nuclear fuel assemblies within a core. The nuclear reactor vessel is supported within the containment as part of the nuclear reactor primary coolant loop. A refueling cavity extends above the nuclear reactor within the containment. An in-containment refueling water storage tank is supported within the containment outside of the refueling cavity, at an elevation above the core for, upon command, flooding at least a portion of the refueling cavity with the coolant in furtherance of refueling the reactor vessel. The in-containment refueling water storage tank has a full level substantially at which a volume of the refueling coolant is maintained during normal reactor operation. An irradiated nuclear fuel assembly storage tank is supported within the containment below a portion of the refueling cavity. The irradiated nuclear fuel assembly storage tank is configured with fuel assembly storage racks for storing irradiated nuclear fuel within the containment outside the core when the reactor vessel is in operation and the refueling cavity is drained. The irradiated nuclear fuel assembly storage tank is configured to selectively place a nuclear fuel assembly storage tank cooling conduit, connected to the irradiated nuclear fuel assembly storage tank, in fluid communication with the in-containment refueling water storage tank or the refueling cavity.

In one embodiment, a portable lower reactor internals storage rack is configured to fit on a lid of the irradiated nuclear fuel assembly storage tank when the lid is closed, for storing the reactor lower internals when they are removed from the nuclear reactor vessel. The lower internals storage rack is configured to be removed from the lid when access is needed to an interior of the irradiated nuclear fuel assembly storage tank to store nuclear fuel.

In still another embodiment, the irradiated nuclear fuel assembly storage tank includes a lid for covering and sealing an access opening in the top of the irradiated nuclear fuel assembly storage tank wherein the lid is coupled to a wall of the irradiated nuclear fuel assembly storage tank through a hinge that is configured to swing the lid out of the way of the access opening when in a fully open position, to load or unload a nuclear fuel assembly into or out of an interior of the irradiated nuclear fuel assembly storage tank.

Preferably, the irradiated nuclear fuel assembly storage tank includes a long-term nuclear fuel assembly storage tank and a short-term nuclear fuel assembly storage tank that are each configured to separately store fuel assemblies. Desirably, the long-term nuclear fuel assembly storage tank has an interior including a plurality of fuel assembly racks that are accessed through a first access opening sealed by a removable first lid and the short-term nuclear fuel assembly storage tank has an interior including a plurality of fuel assembly racks that are respectively accessed through corresponding individual fuel assembly rack opening lids that are supported within a second access opening in the short-term nuclear fuel assembly storage tank. Each of the fuel assembly rack opening lids in the short-term nuclear fuel assembly storage tank cover a corresponding opening in the plurality of fuel assembly racks in a closed position and provide access to the corresponding opening in an open position. In one arrangement, the second access opening includes a second lid that seals the second access opening and seats above the individual fuel assembly rack opening lids. Preferably, the long-term nuclear fuel assembly tank is a cylindrical tank and the short-term nuclear fuel assembly storage tank is a vaulted tank with a liner.

In another embodiment, the fluid communication between the irradiated nuclear fuel assembly storage tank and the in-containment refueling coolant storage tank is configured to flow by natural circulation. Preferably, the fluid communication between the irradiated nuclear fuel assembly storage tank and the refueling cavity is also configured to flow by natural circulation.

This invention also contemplates a method of refueling a nuclear steam supply system having a nuclear reactor primary coolant loop enclosed within a hermetically sealed containment. The containment includes a nuclear reactor vessel for supporting and housing a plurality of nuclear fuel assemblies within a core. The nuclear reactor vessel is supported within the containment as part of the nuclear reactor primary loop. A refueling cavity extends above the nuclear reactor vessel within the containment and an in-containment refueling coolant storage tank is supported within the containment outside the refueling cavity at an elevation above the core for, upon command, flooding at least a portion of the refueling cavity with a refueling coolant in furtherance of refueling the reactor vessel. The in-containment refueling coolant storage tank has a full level substantially at which a volume of the refueling coolant is maintained during normal reactor operation. An irradiated nuclear fuel assembly storage tank is supported within the containment below a portion of the refueling cavity. The irradiated nuclear fuel assembly storage tank is configured with fuel assembly storage racks for storing irradiated nuclear fuel within the containment outside of the core when the reactor vessel is in operation and the refueling cavity is drained. The irradiated nuclear fuel assembly storage tank is also configured to selectively place a nuclear fuel assembly storage tank coolant conduit, connected to the irradiated nuclear fuel assembly storage tank, in fluid communication with the in-containment refueling coolant storage tank or the refueling cavity. The method includes the steps of: flooding the refueling cavity with the coolant from the refueling coolant storage tank; removing a head from the reactor vessel; opening a lid on the irradiated nuclear fuel assembly storage tank; removing at least some of the fuel assemblies from the core into the irradiated nuclear fuel assembly storage tank; closing the lid on the irradiated fuel assembly storage tank; loading a number of new fuel assemblies into the core; closing the head on the reactor vessel; draining the refueling cavity into the in-containment refueling coolant storage tank; and starting up the reactor with at least some of the removed fuel assemblies from the core stored in the irradiated nuclear fuel assembly storage tank.

In one embodiment, the method includes the steps of configuring the irradiated nuclear fuel assembly storage tank coolant conduit in fluid communication with the refueling cavity after the refueling cavity is flooded; and configuring the irradiated nuclear fuel assembly storage tank coolant conduit in fluid communication with the in-containment refueling coolant storage tank after the refueling cavity is drained.

In another embodiment, the method further includes the steps of operating the nuclear steam supply system for an operating cycle; shutting down the reactor vessel; flooding the refueling cavity with the coolant from the refueling coolant storage tank; removing a head from the reactor vessel; opening a lid on the irradiated nuclear fuel assembly storage tank; moving at least some of the fuel assemblies within the irradiated fuel assembly storage tank to a spent fuel pool outside the containment; removing at least some of the fuel assemblies from the core into the irradiated nuclear fuel assembly storage tank; closing the lid on the irradiated fuel assembly storage tank; loading a number of new assemblies into the core; closing the head on the reactor vessel; draining the refueling cavity into the in-containment refueling coolant storage tank; and starting up the reactor with at least some of the fuel assemblies removed from the core stored in the irradiated nuclear fuel assembly storage tank.

Preferably, the irradiated nuclear fuel assembly storage tank includes a long-term nuclear fuel assembly storage tank and a short-term nuclear fuel assembly storage tank. The long-term nuclear fuel assembly storage tank and the short-term nuclear fuel assembly storage tank are each configured to separately store fuel assemblies. In such an embodiment the step of removing at least some of the fuel assemblies from the core into the irradiated nuclear fuel assembly storage tank includes the steps of: identifying the fuel assemblies within the core that are not to be returned to the core; removing at least some of the fuel assemblies in the core that are not to be returned to the core to the long-term nuclear fuel assembly storage tank; and removing at least some of the fuel assemblies in the core that are to be returned to the core to the short-term nuclear fuel assembly storage tank. In a further embodiment, the short-term nuclear fuel assembly storage tank includes a fuel assembly rack having compartments with each compartment having an opening into which one of the fuel assemblies can be loaded, with each compartment having a separate cover which can be individually moved to an open or closed position, including the step of opening only one cover at a time with the remaining covers closed as the fuel assembly is loaded into the corresponding compartment.

In an additional embodiment, the reactor vessel has a lower internals and the long-term nuclear fuel assembly storage tank has a lid with a removable lower internals storage stand that fits on top of the lid. In such an embodiment, the method further includes the steps of: fitting the lower internals storage stand to the lid after the fuel assemblies that are not to be returned to the reactor vessel are loaded into the long-term nuclear fuel assembly storage tank; removing the lower internals from the reactor vessel after all the fuel assemblies have been removed from the core; and placing the lower internals into the removable lower internals storage stand. In such an embodiment the method may also include the steps of: replacing the lower internals into the reactor vessel; and removing the lower internals storage stand from the lid before opening the lid.

BRIEF DESCRIPTION OF THE DRAWINGS

A further understanding of the invention can be gained from the following description of the preferred embodiments when read in conjunction with the accompanying drawings in which.

DESCRIPTION OF THE PREFERRED EMBODIMENT

Figure 2:
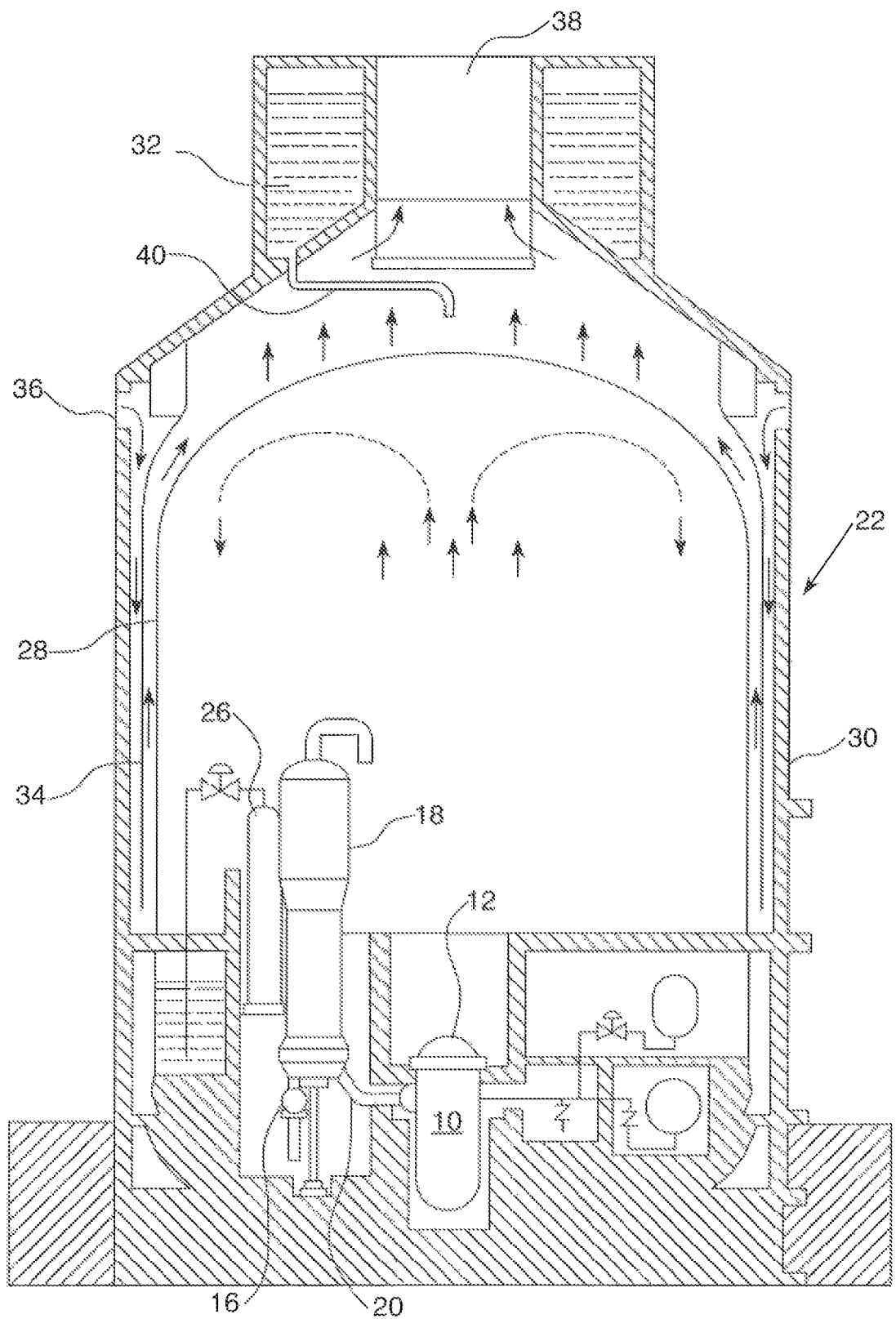
FIG. 2 is a simplified schematic of an AP1000® nuclear steam supply system shown within its passively cooled containment.

As previously mentioned, in the unlikely event of a Fukushima type of occurrence the AP1000® plant is designed to utilize passive safety systems, such as the passively cooled containment 22 shown in FIG. 2, to continue to provide cooling for at least three days. One of the safety systems for accomplishing that objective is the passive containment cooling system illustrated in FIG. 2. The passive containment cooling system 22 surrounds the AP1000® nuclear steam supply system, including the reactor vessel 10, steam generator 18, pressurizer 26 and the main coolant circulation pump 16; all connected by the piping network 20. The containment system 22, in part, comprises a steel dome containment vessel enclosure 28 surrounded by a concrete shield building 30 which provides structural protection for the steel dome containment vessel 28.

The major components of the passive containment cooling system are a passive containment cooling water storage tank 32, an air baffle 34, air inlet 36, air exhaust 38 and water distribution system 40. The passive containment cooling water storage tank 32 is incorporated into the shield building structure 30, above the steel dome containment vessel 28. An air baffle 34 located between the steel dome containment vessel 28 and the concrete shield building 30 defines the cooling air flow path which enters through an opening 36 in the shield building 30 at an elevation approximately at the top of the steel dome containment 28. After entering the shield building 30, the air path travels down one side of the air baffle 34 and reverses direction around the air baffle at an elevation adjacent the lower portion of the steel dome containment vessel and then flows up between the baffle and the steel dome containment vessel 28 and exits at the exhaust opening 38 in the top of the shield building 30. The exhaust opening 38 is surrounded by the passive containment cooling water storage tank 32.

In the unlikely event of an accident, the passive containment cooling system provides water that drains by gravity from the passive containment cooling water storage tank 32 and forms a film over the steel dome containment vessel 28. The water film evaporates thus removing heat from the steel dome containment vessel 28.

The passive containment cooling system is capable of removing sufficient thermal energy, including subsequent decay heat, from the containment atmosphere following a Design Basis event resulting in containment pressurization, such that the containment pressure remains below the design value with no operator action required for at least 72 hours.

The air flow path that is formed between the shield building 30, which surrounds the steel dome containment vessel 28, and the air baffle 34 results in the natural circulation of air upward along the containment vessel's outside steel surface. This natural circulation of air is driven by buoyant forces when the flowing air is heated by the containment steel surface and when the air is heated by and evaporates water that is applied to the containment surface. The flowing air also enhances the evaporation that occurs from the water surface. In the event of an accident, the convective heat transfer to the air by the containment steel surface only accounts for a small portion of the total heat transfer that is required, such total heat transfer being primarily accomplished by the evaporation of water from the wetted areas of the containment steel surface, which cools the water on the surface, which then cools the containment steel, which then cools the inside containment atmosphere and condenses steam within the containment.

In order to maintain a sufficient transfer of heat from the steel dome containment vessel 22 to limit and reduce containment pressure, after the initial three days following a postulated Design Basis event, the AP1000® passive containment cooling system requires that the water continues to be applied to the containment outside steel surface. The water is provided initially by the passive gravity flow mentioned above. After three days, water is provided by active means initially from onsite storage and then from other onsite or offsite sources. A more detailed understanding of this containment cooling process can be found in U.S. patent application Ser. No. 13/444,932, filed Apr. 12, 2012.

Figure 3:
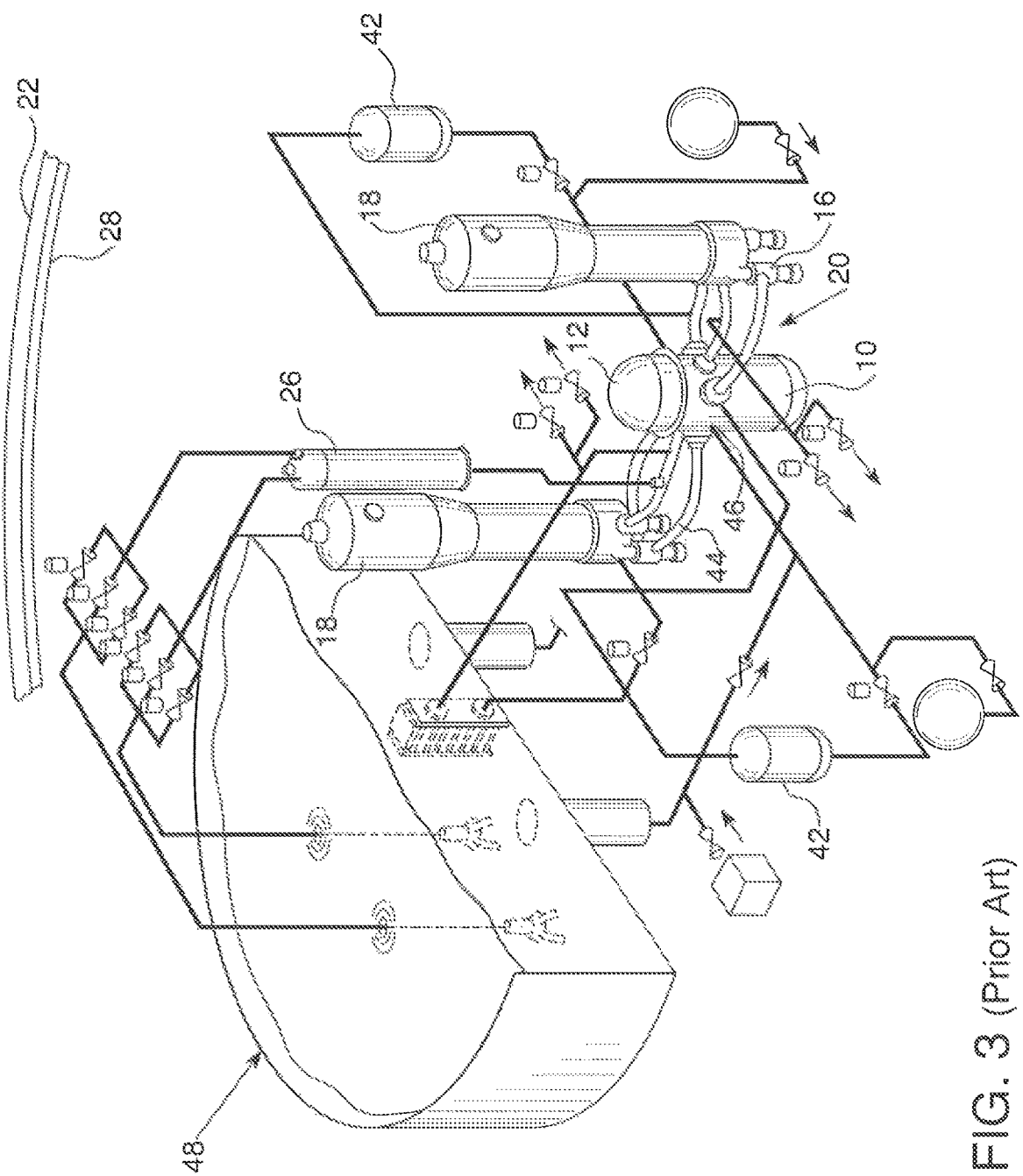
FIG. 3 is an isometric view of the in-containment layout of the components of the AP1000® nuclear steam supply system shown in FIG. 2.

In addition, the AP1000® has passive systems to assure that the fuel assemblies in the core remain covered with coolant. In the unlikely event of a primary coolant loop leak, these systems are automatically activated. A coolant loss may involve only a small quantity, whereby additional coolant can be injected from a relatively small high pressure makeup water supply, without depressurizing the reactor coolant circuit. If a major loss of coolant occurs, it is necessary to add coolant from a low pressure supply containing a large quantity of water. Since it is difficult using pumps to overcome the substantial pressure of the reactor coolant circuit, e.g., 2,250 psi or 150 bar, the reactor coolant circuit is automatically depressurized in the event of a major coolant loss so that coolant water may be added from an in-containment refueling water storage tank, at the ambient pressure within the nuclear reactor containment dome 28. Thus, as shown in FIG. 3, there are two sources of coolant makeup for a loss of coolant in the AP1000® nuclear reactor system. An inlet of the high pressure core makeup tank 42 is coupled by valves to the reactor coolant inlet or cold leg 44. The high pressure core makeup tank 42 is also coupled by motorized valves and check valves to a reactor vessel injection inlet 46. The high pressure core makeup tank 42 is operable to supply additional coolant to the reactor cooling circuit 20, at the operational pressure of the reactor, to make up for relatively small losses. However, the high pressure core makeup tank 42 contains only a limited supply of coolant, though, as can be appreciated from FIG. 3, there are two core makeup tanks in the system.

A much larger quantity of coolant water is available from the in-containment refueling water storage tank 48, at atmospheric pressure due to a vent, which opens from the tank 48 into the interior of the containment building 28. U.S. patent application Ser. No. 12/972,568, filed Dec. 20, 2010 (U.S. Publication No. 2012/0155597, published Jun. 21, 2012), and assigned to the Assignee of this application, describes in more detail how the reactor system is depressurized so that cooling water can be drained from the in-containment refueling water storage tank 48 into the reactor vessel 10.

This invention is an improvement upon the other safety systems of the AP1000® plant by extending the capability to provide spent fuel pool cooling by minimizing the decay heat emanating from the spent fuel in the spent fuel pool. This is accomplished by storing the spent fuel, not to be reused in the reactor vessel, inside the reactor containment 22 for one whole fuel cycle before this spent fuel is transferred to the spent fuel pool. Due to the decreased decay heat level in the spent fuel pool, the water contained in the spent fuel pool resulting from storing the off-loaded spent fuel in the containment for one fuel cycle, the cask loading pit, and the fuel transfer canal have sufficient heat capacity to extend the coping time (time before water is boiled off and the stored spent fuel is uncovered). The decay heat of the spent fuel stored inside the containment will have no impact on the peak containment pressure following an accident, since, as will be explained below, this fuel must first heat the in-containment refueling water storage tank water before contributing to the containment mass and energy. Also, the extra decay heat from the spent fuel stored inside the containment will have only a small impact on the long term passive containment cooling system performance (ideally, the drain rate from the passive containment cooling water storage tank 32 could be adjusted to account for the extra decay heat from the spent fuel stored inside the containment, but this adjustment would only be approximately seven grams per megawatt of extra decay heat).

Figure 4:
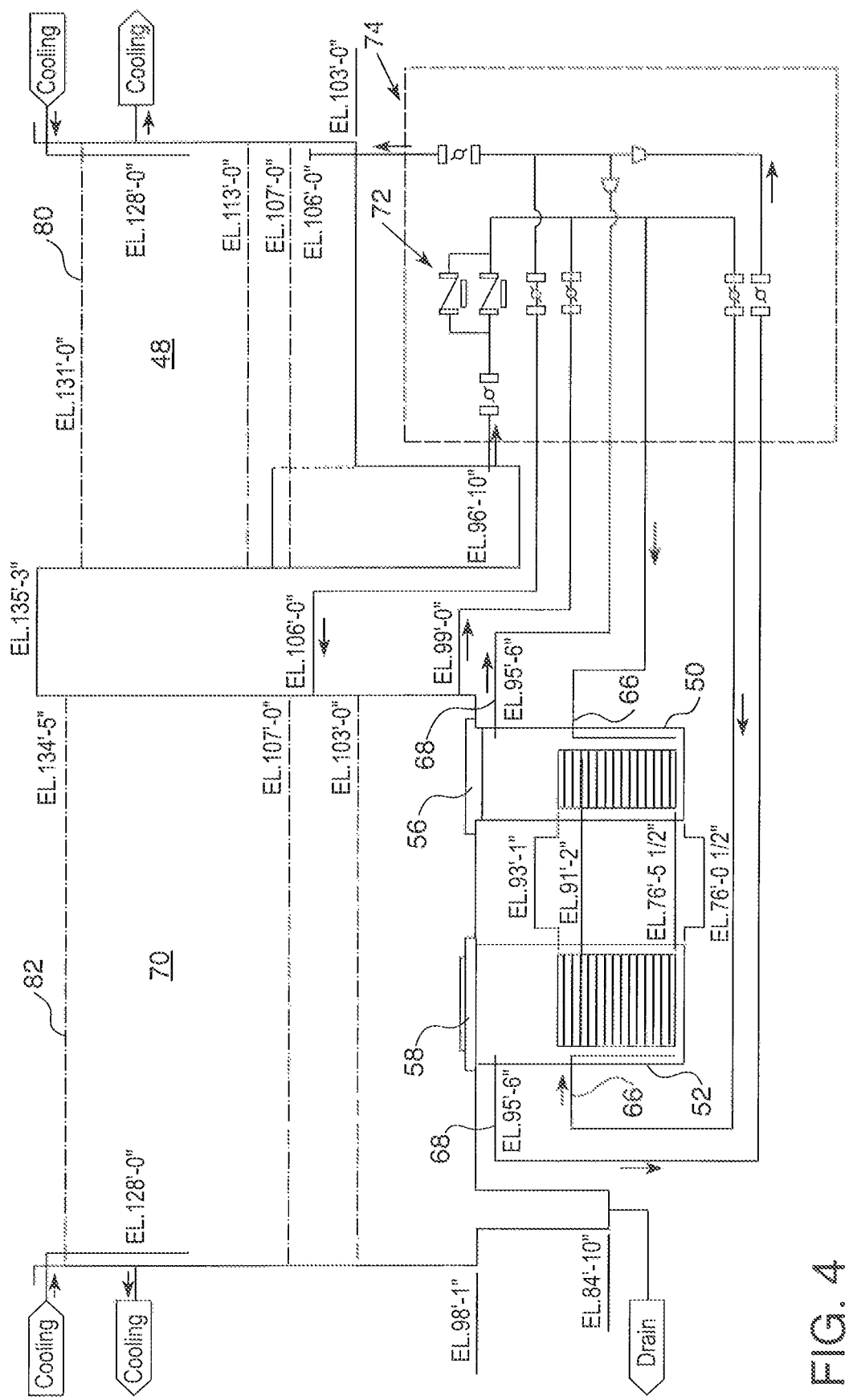
FIG. 4 is a schematic layout of the components of one embodiment of the invention described hereafter.
Figure 7:
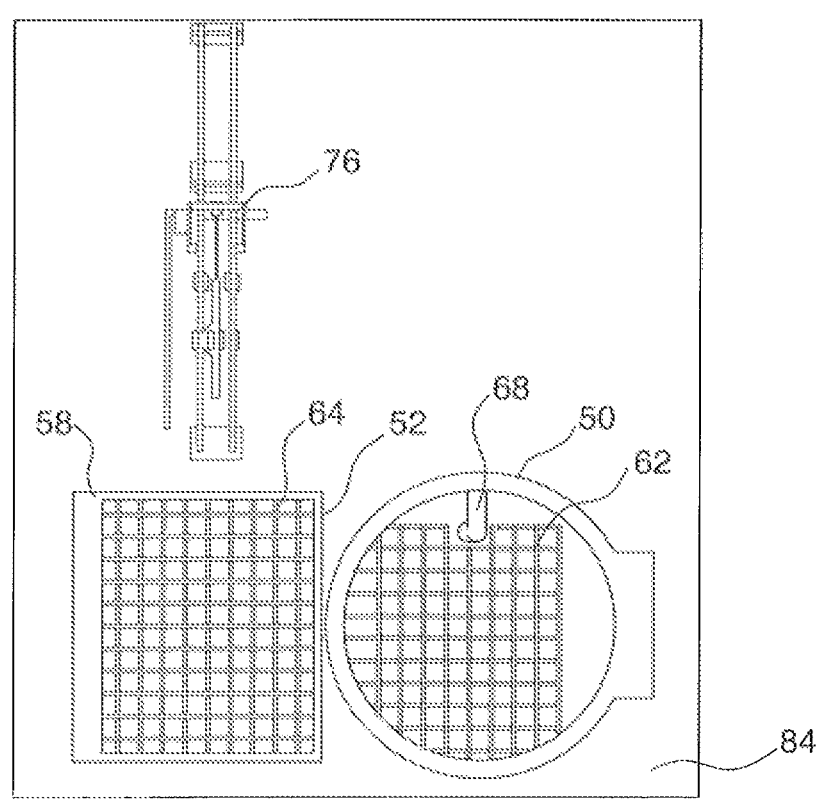
FIG. 7 is a plan view of the short-term and long-term storage tanks shown in FIG. 5 with the short-term and long-term storage tanks shown in an open condition.
Figure 8:
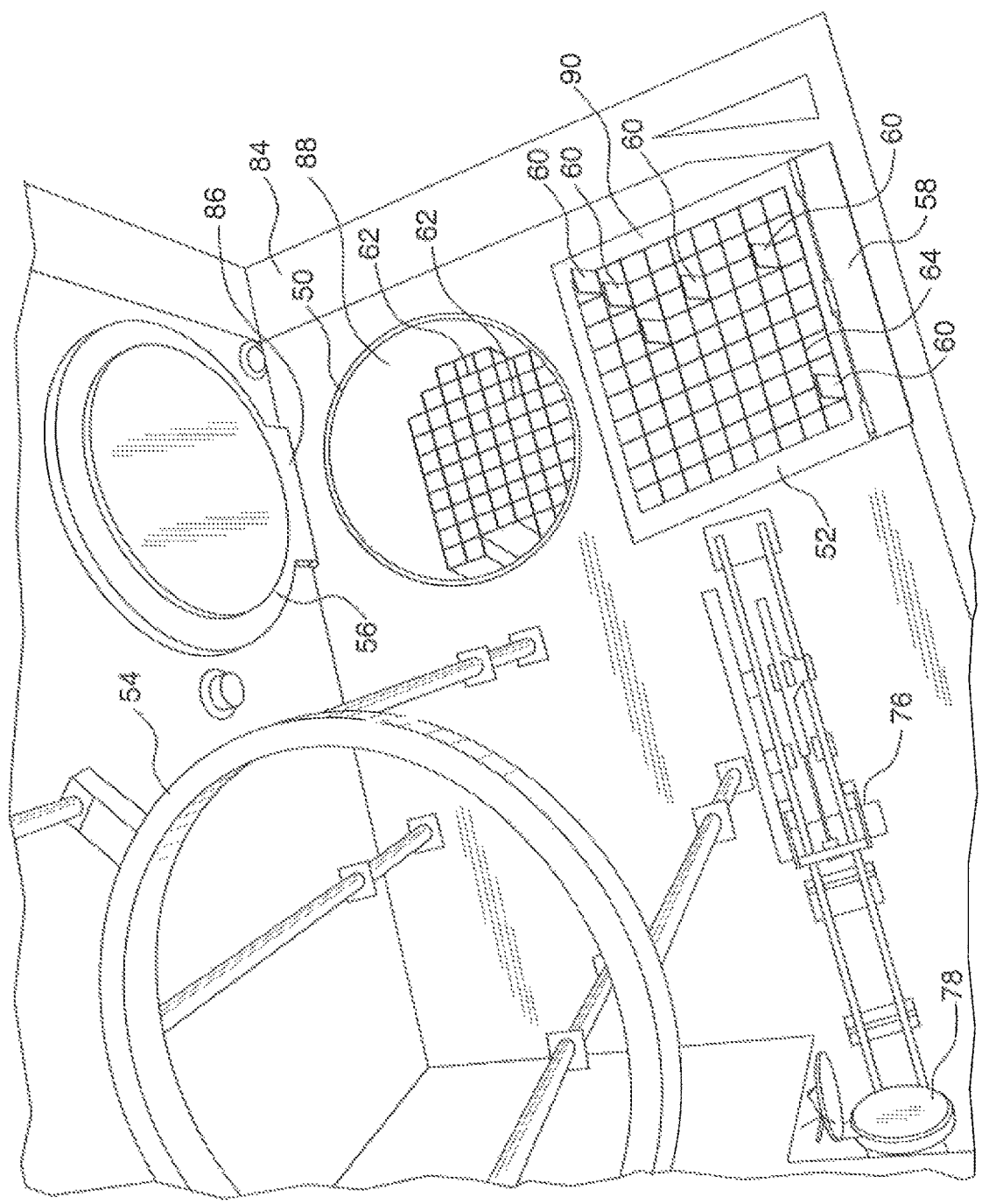
FIG. 8 is a perspective view showing the long-term storage tank lid and internal fuel assembly rack cells, the upper internals stand and the individual fuel rack cell lids of the short-term storage tank of one embodiment of this invention.

One preferred embodiment of this invention is to have the irradiated fuel removed from the reactor vessel 10 and stored inside the containment in a "tank" located below the 98 foot 1 inch elevation of the refueling cavity floor as schematically shown in FIG. 4. Preferably, two "tanks" are provided; one for the spent fuel which will not be returned to the reactor vessel (shown as the long-term storage tank identified by reference character 50 in FIGS. 4-8), and one for the irradiated fuel assemblies that will be returned to the reactor vessel and utilized during the subsequent fuel cycle (shown as the short-term storage tank 52 in FIG. 4-8). In this embodiment, the first of these tanks is located beneath the lower core internals storage stand. The lower internals storage stand is modified so that it can be placed on top of the long-term tank cover 56 (shown in FIGS. 6 and 8) when/if the lower internals need to be removed from the reactor vessel 10. The lower internals storage stand 54 will normally be stored outside the refueling cavity. The upper internals storage stand is shown in FIG. 8 adjacent the fuel transfer machine 76 and the long-term storage tank 50. Preferably, the top of the tanks would be at elevation 98 feet, 1 inch, and would have a closure lid 56, 58 (shown in FIGS. 6 and 8), and will be deep enough to accommodate 14-foot long AP1000® fuel assemblies and provide sufficient water above the fuel for shielding; resulting in the tank bottom being at approximately the 76-foot elevation. The tanks 50, 52 are equipped with a water inlet pipe 66 attached to or extending to the tank bottom and a top mounted water discharge line 68. The tank is designed such that water would naturally circulate from the tank bottom connection, to the tank upper connection driven by the spent fuel decay heat. The short-term storage tank 52 is provided for the irradiated fuel that is temporarily removed from the reactor vessel during refueling. Each of the tanks 50, 52, respectively, have fuel racks 62, 64 with individual cells for each fuel assembly that maintains the spacing between assemblies. Since the short-term storage fuel assemblies are offloaded and then must be reloaded into the reactor vessel 10, it is desirable to equip the short-term storage tank 52 with a closure head, such as lid 56 that can be easily opened and closed. Desirably, this includes a permanently installed lid above each of the fuel rack 64 cells that has individual, small covers 60 or hatches for each fuel assembly. The fuel racks 64 are accessed through corresponding individual fuel rack opening lids 60 that are supported within an access opening 90 in the short-term nuclear fuel assembly storage tank 52. The irradiated nuclear fuel assembly storage tank 50 includes a lid 56 for covering and sealing an access opening 88 in the top of the irradiated nuclear fuel assembly storage tank 50 wherein the lid 56 is coupled to a wall 84 of the top of the irradiated nuclear fuel assembly storage tank 50 through a hinge 86 that is configured to swing the lid 56 out of the way of the access opening 88 when in a fully open position, to load or unload a nuclear fuel assembly into or out of an interior of the irradiated nuclear fuel assembly storage tank 50.

Figure 5:
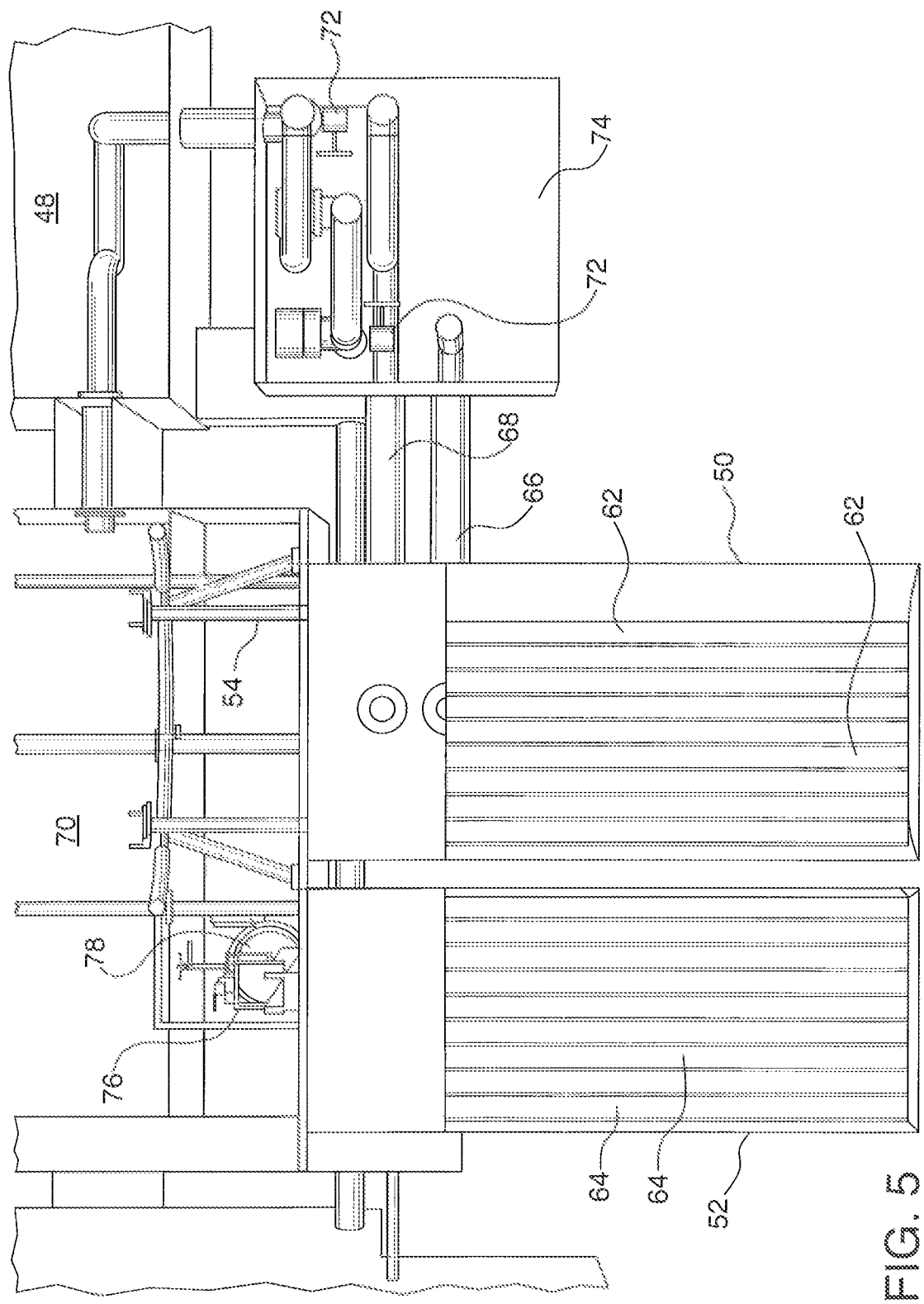
FIG. 5 is sectional view of the short-term and long-term storage tanks of one embodiment of this invention.
Figure 6:
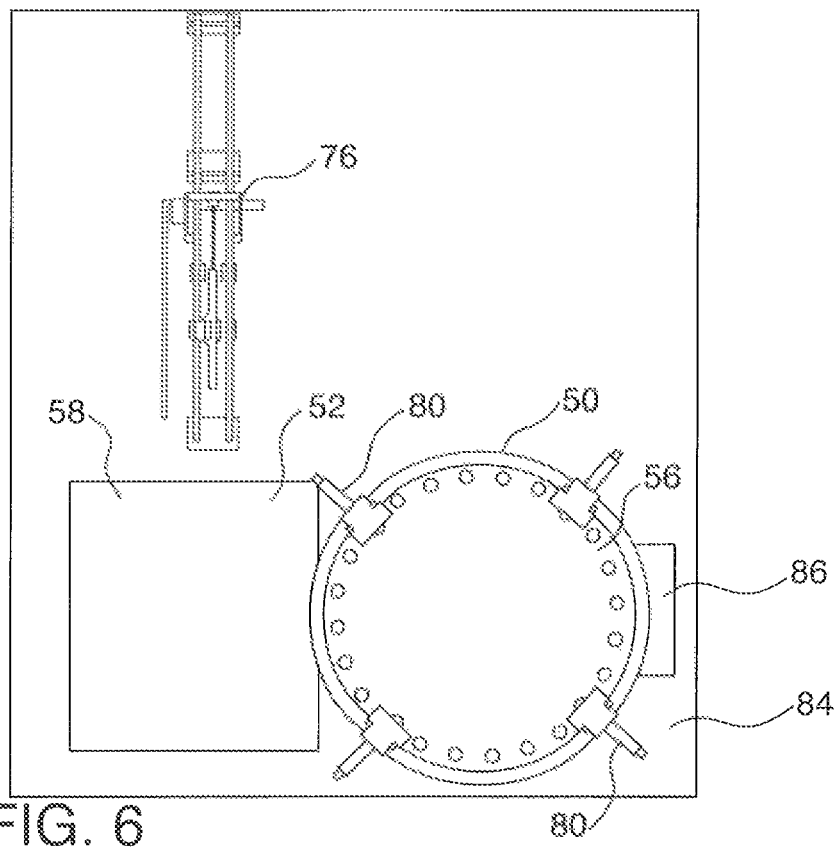
FIG. 6 is a plan view of the short-term and long-term storage tank shown in FIG. 5 with the lids closed.

The tank bottom and upper piping 66, 68, respectively, each contain valves 72 that could be positioned so that both the bottom inlet pipe 66 and the top discharge pipe 68 are aligned with either the water in the refueling cavity 70, during refueling operations, or the water in the in-containment refueling water storage tank 48, when the refueling cavity is drained during shutdown or during normal plant operation. As shown in FIGS. 4 and 5, the valves 72 are located in a valve room 74 preferably under the in-containment refueling water storage tank 48 and can be accessed either from the adjacent loop compartment or via a vertical access tunnel (to prevent flood-up and not impact current containment flood-up levels). In FIGS. 6, 7 and 8 the long-term tank 50 is shown as a cylindrical tank with a sealable lid 56 designed to withstand hydrostatic pressure from the in-containment refueling water storage tank; while the short-term tank 52 is shown as a vaulted tank with a liner.

Having the most recent offloaded fuel from the reactor vessel 10 remain inside the containment and with the spent fuel not being transferred to the spent fuel pool for a full fuel cycle, greatly reduces the spent fuel pool decay heat load such that the coping time, the time required heat and boil off the water available above the spent fuel in the spent fuel pool, is greatly extended; and could be further extended if the spent fuel pool was cooled by air, as explained in copending application Ser. No. 14/195,878, filed concurrently herewith. The spent fuel inside the containment can utilize the existing passive containment cooling system, previously described to provide heat removal with water assisted evaporation or air-only cooling, as appropriate.

It should also be appreciated that the adoption of just the long-term storage tank 50 inside the containment, with no short-term tank, can extend the AP1000® plant's coping time. In this case, during normal operation, the most recent core offload would remain inside the containment, thus reducing the decay heat load in the spent fuel pool. During a full core offload, the fuel assemblies that will be reloaded into the reactor vessel are temporarily placed in the spent fuel pool. During this time, the passive containment cooling water storage tank can be aligned to the spent fuel pool to extend its coping time; while the decay heat from the offloaded fuel assemblies in the long-term storage tank 50 can be transferred to the atmosphere by air only cooling of the containment shell 28.

Figure 1:
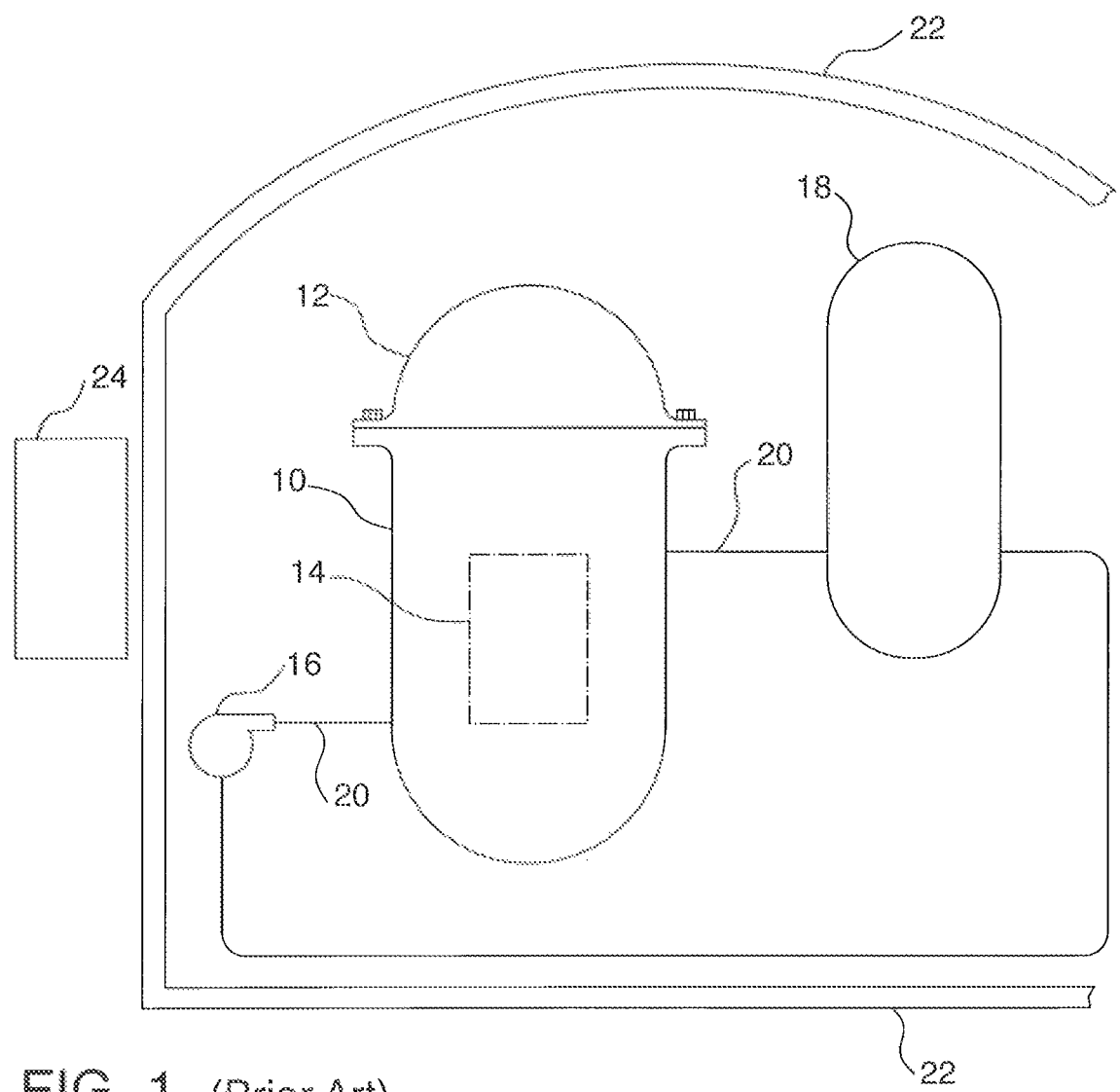
FIG. 1 is a simplified schematic of a conventional nuclear reactor system.

The method of using the two tanks as part of the refueling operation is as follows. After the reactor vessel head 12 is removed and the refueling cavity 70 is filled with water, the long-term spent fuel storage tank 50 lower inlet 66 and upper discharge lines 68 are aligned with the refueling cavity 70 switching the cooling water naturally circulating through the tank from the in-containment refueling water storage tank water to the refueling cavity water. The same operation would apply to the short-term spent fuel storage tank 52. The means currently employed to actively cool the cavity water is then turned on, and the active cooling of the in-containment refueling water storage tank water is shut off. When the reactor vessel upper internals are removed and refueling is to commence, the closure head 56 of the long-term storage tank 50 (storing the spent fuel from the previous refueling outage) is opened and the spent fuel in this tank is removed by the fuel transfer machine 76 and transferred by way of the fuel transfer tube 78 to the spent fuel pool 24 schematically shown in FIG. 1. Operations will then commence on defueling the reactor vessel 10 and the fuel which will not be used in the next fuel cycle will be placed inside the long-term storage tank 50, and the tank lid 56 replaced and fastened. The remaining fuel in the reactor vessel 10 would then be removed if there was to be a full core offload, and placed into the short-term fuel storage tank 52. When and if the refueling cavity is to be drained during the outage, fuel from the short-term fuel storage tank 52 is to be moved to the spent fuel pool 24 prior to the refueling cavity being drained. The long-term storage tank 50 is again aligned with the in-containment refueling water storage tank, switching the natural circulation cooling water flow from the refueling cavity to the in-containment refueling water storage tank. The means of actively cooling the in-containment refueling water storage tank water would also be turned on, and the active cooling of the refueling cavity water would be shut off. When refueling the vessel was to begin, the tanks would be realigned to the reactor refueling cavity as it was filled with water. The fuel from the short-term irradiated fuel storage tank 52 would then be reloaded into the reactor vessel 10 and new fuel from the spent fuel pool would be added to the reactor vessel. Following the refueling of the reactor vessel 10 and as the water in the refueling cavity 70 is being transferred to the in-containment refueling water storage tank 48, the long-term spent fuel storage tank 50 is aligned so that cooling flow was naturally circulated from/to the in-containment refueling water storage tank 48. The means of actively cooling the refueling cavity water would also be turned off, and the active cooling of the in-containment refueling water storage tank water would be turned on.

In addition, when the long-term irradiated fuel storage tank 50 and/or the short-term fuel storage tank 52 is in operation with natural circulation to either the refueling cavity or the in-containment refueling water storage tank to cool the spent fuel, the refueling cavity or the in-containment refueling water storage tank water should be cooled and maintained at or below 100° F. (37.8° C.) to minimize evaporation and/or fogging inside the containment. Should the reactor vessel internals need to be removed (after all the fuel in the reactor vessel has been removed), the lower internals storage stand 54 is to be placed over the long-term spent fuel storage tank 50 and the lower internals are stored as normal.

Due to the large amount of heat from the spent fuel that will be added to the cavity or the in-containment refueling water storage tank, pumped cooling will need to be provided for each water body. Preferably, the pumps take suction from the top of these tanks with a suction line located just below the normal water level and the cooling return line should have a siphon break in order to avoid the possibility of draining the cavity or the in-containment refueling water storage tank should a line break occur (similar to the current spent fuel pool suction and return line). This suction line location enables the heated water to be drawn from the refueling cavity or the in-containment refueling water storage tank without first heating up the entire water volume. Since the pump suction line should be located near the normal full refueling cavity or in-containment refueling water storage tank water level, respectively, 82, 80, and since the refueling cavity 70 or the in-containment refueling water storage tank 48 cooling is a continuous operation (during most of the refueling and during normal operation), pumps and heat exchangers separate from the spent fuel system and normal residual heat removal system pumps and heat exchangers, should be provided.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A nuclear steam supply system having a nuclear reactor primary coolant loop enclosed within a hermetically sealed containment, the containment comprising:

a nuclear reactor vessel for supporting and housing a plurality of nuclear fuel assemblies within a core, the nuclear reactor vessel being supported within the containment as part of the nuclear reactor primary coolant loop;

a refueling cavity extending above the nuclear reactor vessel within the containment;

an in-containment refueling coolant storage tank supported within the containment outside the refueling cavity, at an elevation above the core for, upon command, flooding at least a portion of the refueling cavity with a refueling coolant in furtherance of refueling the reactor vessel, the in-containment refueling coolant storage tank having a full level substantially at which a volume of the refueling coolant is maintained during normal reactor operation; and an irradiated nuclear fuel assembly storage tank supported within the containment below a portion of the refueling cavity, the irradiated nuclear fuel assembly storage tank is configured with a plurality of fuel assembly storage racks for storing irradiated nuclear fuel within the containment outside the core when the reactor vessel is in operation and the refueling cavity is drained, and the irradiated nuclear fuel assembly storage tank is configured to selectively place a nuclear fuel assembly storage tank coolant conduit connected to the irradiated nuclear fuel assembly storage tank in fluid communication with the in-containment refueling coolant storage tank or the refueling cavity; and, a portable lower reactor internals storage stand configured to fit on a lid of the irradiated nuclear fuel assembly storage tank when the lid is closed, for storing the reactor lower internals when they are removed from the nuclear reactor vessel and configured to be removed from the lid when access is needed to an interior of the irradiated nuclear fuel assembly storage tank to store nuclear fuel.

2. The nuclear steam supply system of claim 1 wherein the irradiated nuclear fuel assembly storage tank includes a lid for covering and sealing an access opening in the top of the irradiated nuclear fuel assembly storage tank wherein the lid is coupled to a wall of the irradiated nuclear fuel assembly storage tank through a hinge that is configured to swing the lid out of the way of the access opening when in a fully open position, to load or unload a nuclear fuel assembly into or out of an interior of the irradiated nuclear fuel assembly storage tank.

3. The nuclear steam supply system of claim 1 wherein the irradiated nuclear fuel assembly storage tank includes a long-term nuclear fuel assembly storage tank and short-term nuclear fuel assembly storage tank that are each configured to separately store fuel assemblies.

4. The nuclear steam supply system of claim 3 wherein the long-term nuclear fuel assembly storage tank has an interior including the plurality of fuel assembly racks that are accessed through a first access opening sealed by a removable first lid and the short-term nuclear fuel assembly storage tank has an interior including a plurality of fuel assembly racks that are respectively accessed through corresponding individual fuel assembly rack opening lids that are supported within a second access opening in the short-term nuclear fuel assembly storage tank, each of the fuel assembly rack opening lids covering a corresponding opening in the plurality of fuel assembly racks in a closed position and providing access to the corresponding opening in an open position.

5. The nuclear steam supply system of claim 4 wherein the second access opening includes a second lid that seals the second access opening wherein the second lid seats above the individual fuel assembly rack opening lids.

6. The nuclear steam supply system of claim 3 wherein the long-term nuclear fuel assembly storage tank is a cylindrical tank.

\* \* \* \* \*